United States Patent
Lee

(10) Patent No.: US 8,700,035 B2
(45) Date of Patent: Apr. 15, 2014

(54) MOBILE TERMINAL AND METHOD FOR DISPLAYING WIRELESS DEVICES THEREOF

(75) Inventor: Dong-Hyun Lee, Seoul (KR)

(73) Assignee: LG Electronics Inc., Seoul (KR)

(*) Notice: Subject to any disclaimer, the term of this patent is extended or adjusted under 35 U.S.C. 154(b) by 673 days.

(21) Appl. No.: 12/252,002

(22) Filed: Oct. 15, 2008

(65) Prior Publication Data

US 2009/0270093 A1     Oct. 29, 2009

(30) Foreign Application Priority Data

Dec. 18, 2007  (KR) .................. 10-2007-0133723

(51) Int. Cl.
*H04W 4/00* (2009.01)

(52) U.S. Cl.
USPC ............... 455/434; 455/115.3; 455/456.3; 455/457; 455/513; 455/566

(58) Field of Classification Search
USPC ............ 455/41.2, 41.3, 66.1, 67.11, 67.14, 455/67.5, 56.1, 556.2, 557, 566, 115.3, 134, 455/161.3, 226.2, 226.3, 416, 434, 456.3, 455/457, 513; 345/419, 589, 593, 594, 597, 345/636, 650, 664, 665, 156, 501, 653, 345/679; 715/716, 719, 733, 736–740, 744, 715/763, 764, 836, 854–860, 862, 864, 848, 715/850, 852; 340/988, 989, 990, 995.1, 340/995.11, 995.12; 701/207, 208, 211, 701/212, 213, 214, 215; 342/118
See application file for complete search history.

(56) References Cited

U.S. PATENT DOCUMENTS

| | | | | |
|---|---|---|---|---|
| 6,018,650 | A * | 1/2000 | Petsko et al. | 455/234.1 |
| 6,757,521 | B1 | 6/2004 | Ying | |
| 6,957,045 | B2 * | 10/2005 | Haller et al. | 455/41.1 |
| 7,043,277 | B1 * | 5/2006 | Pfister | 455/566 |
| 7,102,640 | B1 * | 9/2006 | Aholainen et al. | 345/440 |
| 7,113,126 | B2 | 9/2006 | Durst et al. | |
| 7,146,151 | B2 * | 12/2006 | Arimitsu | 455/343.2 |
| 7,239,881 | B2 | 7/2007 | Lekutai | |
| 7,243,054 | B2 * | 7/2007 | Rappaport et al. | 703/2 |
| 7,272,407 | B2 * | 9/2007 | Strittmatter et al. | 455/500 |
| 7,379,747 | B2 * | 5/2008 | Yu | 455/522 |
| 7,460,505 | B2 * | 12/2008 | Spain | 370/332 |

(Continued)

FOREIGN PATENT DOCUMENTS

| | | |
|---|---|---|
| EP | 1398913 A2 | 3/2004 |
| EP | 1450517 A1 | 8/2004 |

(Continued)

*Primary Examiner* — Kent Chang
*Assistant Examiner* — Gerald Oliver
(74) *Attorney, Agent, or Firm* — Birch, Stewart, Kolasch & Birch, LLP

(57) ABSTRACT

A mobile terminal including a wireless communication unit configured to wirelessly communicate with wireless devices to be connected with the mobile terminal, a display unit configured to display information about the wireless devices, an input unit configured to input search information including at least one of a distance range to search for the wireless devices and a type of the wireless devices, and a controller configured to control the wireless communication unit to search for the wireless devices based on the input search information and to control the display unit to display responding wireless devices that responded to the search by the wireless communication unit according to the input search information.

15 Claims, 10 Drawing Sheets

(56) References Cited

U.S. PATENT DOCUMENTS

| | | |
|---|---|---|
| 7,668,508 B2 * | 2/2010 | Zheng et al. ............... 455/41.2 |
| 7,747,223 B2 * | 6/2010 | Wilson et al. .............. 455/67.11 |
| 7,756,485 B2 * | 7/2010 | Paas et al. .................. 455/67.7 |
| 7,764,954 B2 * | 7/2010 | Beyer, Jr. ................... 455/416 |
| 7,774,028 B1 * | 8/2010 | Pfister et al. ................ 455/566 |
| 7,830,250 B2 * | 11/2010 | Huseth et al. ............ 340/539.13 |
| 7,840,237 B2 * | 11/2010 | Panabaker et al. .......... 455/566 |
| 2004/0176117 A1 | 9/2004 | Strittmatter et al. |
| 2004/0203838 A1 * | 10/2004 | Joshi et al. .................. 455/455 |
| 2004/0204151 A1 * | 10/2004 | Muthuswamy et al. ...... 455/567 |
| 2005/0136845 A1 | 6/2005 | Masuoka et al. |
| 2007/0105500 A1 * | 5/2007 | Kim ............................ 455/41.2 |
| 2007/0149237 A1 * | 6/2007 | Russell et al. ................ 455/522 |
| 2007/0155408 A1 * | 7/2007 | Belcea et al. ................ 455/458 |
| 2007/0202808 A1 | 8/2007 | Kim |
| 2007/0264991 A1 | 11/2007 | Jones et al. |
| 2008/0079604 A1 * | 4/2008 | Madonna et al. ........ 340/825.72 |
| 2009/0325599 A1 * | 12/2009 | Vuori ........................ 455/456.1 |

FOREIGN PATENT DOCUMENTS

| | | |
|---|---|---|
| EP | 1507362 A1 | 2/2005 |
| EP | 1 679 840 A1 | 7/2006 |
| EP | 1720328 A | 11/2006 |
| WO | WO 03/081373 A2 | 10/2003 |

* cited by examiner

MOBILE TERMINAL AND METHOD FOR DISPLAYING WIRELESS DEVICES THEREOF

This application claims priority to Korean Application No. 10-2007-0133723 filed in Korea on Dec. 18, 2007, the entire contents of which are incorporated by reference in their entirety.

BACKGROUND OF THE INVENTION

1. Field of the Invention

The present invention relates to a mobile terminal and corresponding method for searching and displaying various information about wireless devices used for pairing with the mobile terminal.

2. Description of the Background Art

Mobile terminals now provide many additional services beside the basic call service. For example, user's can now access the Internet, play games, watch videos, listen to music, capture images and videos, record audio files, etc. Mobile terminals also now provide broadcasting programs such that user can watch television shows, sporting programs, videos etc.

In addition, the user can pair (wirelessly connect) an external device such as an earpiece to the mobile terminal. To perform this function, the user can select a pairing option (e.g., Bluetooth) on the terminal and then adds the external device. The mobile terminal then searches for the external device and attempts to pair the device with the mobile terminal. However, the related art mobile terminal significantly limits the user choice in selecting or determining the external device or devices to be paired with the terminal.

SUMMARY OF THE INVENTION

Accordingly, one object of the present invention is to address the above-noted and other drawbacks.

Another object of the present invention to provide a mobile terminal and corresponding method for selectively displaying wireless devices within a specific search range based on a search range set or selected by a user of the mobile terminal.

Yet another object of the present invention to provide a mobile terminal and corresponding method for selectively displaying wireless devices having a RSSI (received signal strength indication) that is greater than a preset value.

Still another object of the present invention to provide a mobile terminal and corresponding method for displaying information indicating signal strengths of searched wireless devices.

Yet another object of the present invention to provide a mobile terminal and corresponding method for visually displaying wireless devices according to a type of the searched wireless devices.

To achieve these and other advantages and in accordance with the purpose of the present invention, as embodied and broadly described herein, the present invention provides in one aspect a mobile terminal including a wireless communication unit configured to wirelessly communicate with wireless devices to be connected with the mobile terminal, a display unit configured to display information about the wireless devices, an input unit configured to input search information including at least one of a distance range to search for the wireless devices and a type of the wireless devices, and a controller configured to control the wireless communication unit to search for the wireless devices based on the input search information and to control the display unit to display responding wireless devices that responded to the search by the wireless communication unit according to the input search information.

In another aspect, the present invention provides a method of controlling a mobile terminal, and which includes inputting search information including at least one of a distance range to search for wireless devices and a type of the wireless devices to be connected to the mobile terminal, searching for the wireless devices based on the input search information, and displaying responding wireless devices that responded to the search by the wireless communication unit according to the input search information.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Figure 1:
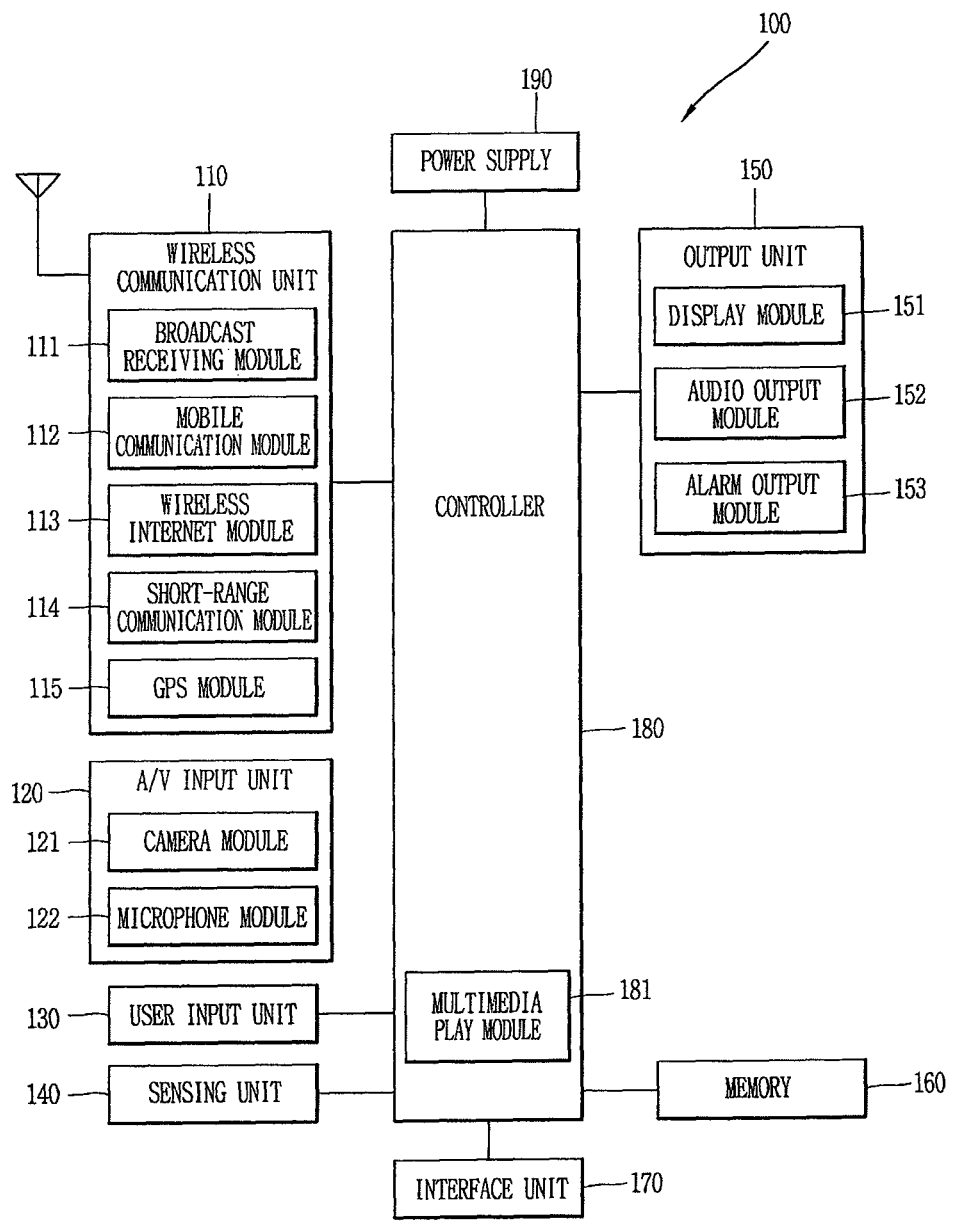
FIG. 1 is a block diagram of a mobile terminal according to an embodiment of the present invention.

FIG. 1 is a block diagram of a mobile terminal 100 according to an embodiment of the present invention. As shown, the mobile terminal 100 includes a wireless communication unit 110 having one or more components which permits wireless communication between the mobile terminal 100 and a wireless communication system or network within which the mobile terminal is located.

For example, the wireless communication unit 110 includes a broadcast receiving module 111 that receives a broadcast signal and/or broadcast associated information from an external broadcast managing entity via a broadcast channel. The broadcast channel may include a satellite channel and a terrestrial channel.

In addition, the broadcast managing entity generally refers to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

In addition, the broadcast signal may be implemented as a TV broadcast signal, a radio broadcast signal, and a data broadcast signal, among others. The broadcast signal may further include a broadcast signal combined with a TV or radio broadcast signal.

The broadcast receiving module 111 is also configured to receive broadcast signals transmitted from various types of broadcast systems. For example, such broadcasting systems include the digital multimedia broadcasting-terrestrial (DMB-T) system, the digital multimedia broadcasting-satellite (DMB-S) system, the digital video broadcast-handheld (DVB-H) system, the data broadcasting system known as media forward link only (MediaFLO®) and the integrated services digital broadcast-terrestrial (ISDB-T) system among others. Receiving multicast signals is also possible. Further, data received by the broadcast receiving module 111 may be stored in a suitable device, such as a memory 160.

The wireless communication unit 110 also includes a mobile communication module 112 that transmits/receives wireless signals to/from one or more network entities (e.g., base station, Node-B). Such signals may represent audio, video, multimedia, control signaling, and data, among others.

Also included is a wireless Internet module 113 that supports Internet access for the mobile terminal. The module 113 may be internally or externally coupled to the terminal. The wireless communication unit 110 also includes a short-range communication module 114 that facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

A position-location module 115 is also included in the wireless communication unit 110 and identifies or otherwise obtains the location of the mobile terminal 100. The position-location module 115 may be implemented using global positioning system (GPS) components which cooperate with associated satellites, network components, and combinations thereof.

In addition, as shown in FIG. 1, the mobile terminal 100 also includes an Audio/video (A/V) input unit 120 that provides audio or video signals to the mobile terminal 100. As shown, the A/V input unit 120 includes a camera 121 and a microphone 122. The camera 121 receives and processes image frames of still pictures or video.

Further, the microphone 122 receives an external audio signal while the portable device is in a particular mode, such as a phone call mode, recording mode and voice recognition mode. The received audio signal is then processed and converted into digital data. Also, the portable device, and in particular, the A/V input unit 120, typically includes assorted noise removing algorithms to remove noise generated in the course of receiving the external audio signal. In addition, data generated by the A/V input unit 120 may be stored in the memory 160, utilized by an output unit 150, or transmitted via one or more modules of the communication unit 110. If desired, two or more microphones and/or cameras may be used.

The mobile terminal 100 also includes a user input unit 130 that generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touch screen display, which will be described in more detail below.

A sensing unit 140 is also included in the mobile terminal 100 and provides status measurements of various aspects of the mobile terminal 100. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, etc.

As an example, when the mobile terminal 100 is a slide-type mobile terminal, the sensing unit 140 may sense whether a sliding portion of the mobile terminal 100 is open or closed. Other examples include the sensing unit 140 sensing the presence or absence of power provided by a power supply 190, the presence or absence of a coupling or other connection between an interface unit 170 and an external device, etc.

Further, the interface unit 170 is often implemented to couple the mobile terminal 100 with external devices. Typical external devices include wired/wireless headphones, external chargers, power supplies, storage devices configured to store data (e.g., audio, video, pictures, etc.), earphones, and microphones, among others. In addition, the interface unit 170 may be configured using a wired/wireless data port, a card socket (e.g., for coupling to a memory card, a subscriber identity module (SIM) card, a user identity module (UIM) card, a removable user identity module (RUIM) card, etc.), audio input/output ports and video input/output ports.

The output unit 150 generally includes various components which support the output requirements of the mobile terminal 100. The mobile terminal 100 also includes a display 151 that visually displays information associated with the mobile terminal 100. For instance, if the mobile terminal 100 is operating in a phone call mode, the display 151 will generally provide a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

Further, the display 151 also preferably includes a touch screen working in cooperation with an input device, such as a touchpad. This configuration permits the display 151 to function both as an output device and an input device. In addition, the display 151 may be implemented using display technologies including, for example, a liquid crystal display (LCD), a thin film transistor-liquid crystal display (TFT-LCD), an organic light-emitting diode display (OLED), a flexible display and a three-dimensional display.

The mobile terminal 100 may also include one or more of such displays. An example of a two-display embodiment is one in which one display is configured as an internal display (viewable when the terminal is in an opened position) and a second display configured as an external display (viewable in both the open and closed positions).

FIG. 1 further shows the output unit 150 having an audio output module 152 which supports the audio output requirements of the mobile terminal 100. The audio output module 152 is often implemented using one or more speakers, buzzers, other audio producing devices, and combinations thereof.

Further, the audio output module 152 functions in various modes including a call-receiving mode, a call-placing mode, a recording mode, a voice recognition mode and a broadcast reception mode. During operation, the audio output module 152 outputs audio relating to a particular function (e.g., call received, message received, and errors).

In addition, the output unit 150 is further shown having an alarm 153, which is used to signal or otherwise identify the occurrence of a particular event associated with the mobile terminal 100. Typical events include a call received, a message received and user input received. An example of such output includes the providing of tactile sensations (e.g., vibration) to a user. For instance, the alarm 153 may be configured to vibrate responsive to the mobile terminal 100 receiving a call or message.

As another example, a vibration is provided by the alarm 153 responsive to receiving user input at the mobile terminal 100, thus providing a tactile feedback mechanism. Further, the various outputs provided by the components of the output unit 150 may be separately performed, or such output may be performed using any combination of such components.

In addition, the memory 160 is generally used to store various types of data to support the processing, control, and storage requirements of the mobile terminal 100. Examples of such data include program instructions for applications operating on the mobile terminal 100, call history, contact data, phonebook data, messages, pictures, video, etc.

Further, the memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The terminal 100 also includes a controller 180 that typically controls the overall operations of the mobile terminal 100. For instance, the controller 180 performs the control and processing associated with voice calls, data communications, instant message communications, video calls, camera operations and recording operations. As shown in FIG. 1, the controller 180 may also include a multimedia module 181 for providing multimedia playback functions. The multimedia module 181 may be configured as part of the controller 180, or may be implemented as a separate component.

In addition, a power supply 190 provides power used by the various components for the portable device. The provided power may be internal power, external power, or combinations thereof.

Figure 2:
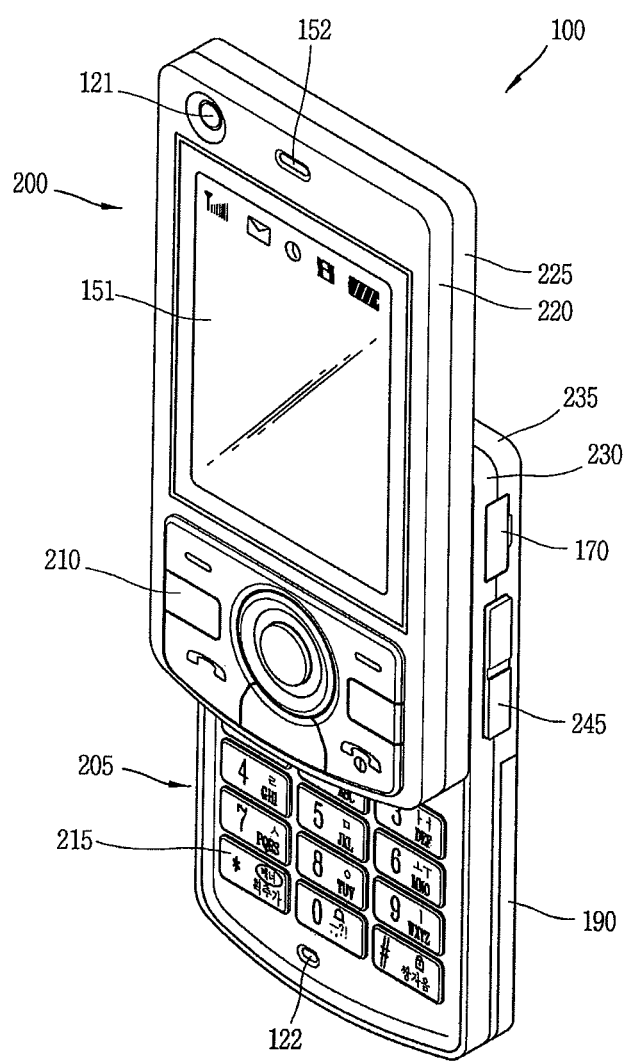
FIG. 2 is a front perspective view of mobile terminal according to an embodiment of the present invention.

Next, FIG. 2 is a front side view of the mobile terminal 100 according to an embodiment of the present invention. As shown in FIG. 2, the mobile terminal 100 includes a first body 200 configured to slideably cooperate with a second body 205. The user input unit 130 described in FIG. 1 may include a first input unit such as function keys 210, a second input unit such as a keypad 215, and a third input unit such as side keys 245.

The function keys 210 are associated with the first body 200, and the keypad 215 is associated with the second body 205. The keypad 215 includes various keys (e.g., numbers, characters, and symbols) to enable a user to place a call, prepare a text or multimedia message, and otherwise operate the mobile terminal 100.

In addition, the first body 200 slides relative to the second body 205 between open and closed positions. In a closed position, the first body 200 is positioned over the second body 205 in such a manner that the keypad 215 is substantially or completely obscured by the first body 200. In the open position, user access to the keypad 215, as well as the display 151 and function keys 210, is possible. The function keys 210 are convenient to a user for entering commands such as start, stop and scroll commands.

Further, the mobile terminal 100 is operable in either a standby mode (e.g., able to receive a call or message, receive and respond to network control signaling), or an active call mode. Typically, the mobile terminal 100 functions in a standby mode when in the closed position, and an active mode when in the open position. However, the mode configuration may be changed as required or desired.

In addition, the first body 200 is formed from a first case 220 and a second case 225, and the second body 205 is formed from a first case 230 and a second case 235. The first and second cases are preferably formed from a suitably ridge material such as injection molded plastic, or formed using metallic material such as stainless steel (STS) and titanium (Ti).

If desired, one or more intermediate cases may be provided between the first and second cases of one or both of the first and second bodies 200 and 205. In addition, the first and second bodies 200 and 205 are typically sized to receive electronic components used to support the operation of the mobile terminal 100.

Also, the first body 200 includes the camera 121 and the audio output unit 152, which is configured as a speaker, positioned relative to the display 151. The camera 121 may also be constructed in such a manner that it can be selectively positioned (e.g., rotated, swiveled, etc.) relative to the first body 200.

Further, the function keys 210 are positioned adjacent to a lower side of the display 151. As discussed above, the display 151 can be implemented as an LCD or OLED. The display 151 may also be configured as a touch screen having an underlying touchpad which generates signals responsive to user contact (e.g., finger, stylus, etc.) with the touch screen.

Also, the second body 205 includes the microphone 122 positioned adjacent to the keypad 215, and side keys 245, which are one type of a user input unit, positioned along the side of the second body 205. Preferably, the side keys 245 are configured as hot keys, such that the side keys 245 are associated with a particular function of the mobile terminal 100. As shown, the interface unit 170 is positioned adjacent to the side keys 245, and the power supply 190 in a form of a battery is located on a lower portion of the second body 205.

Figure 3:
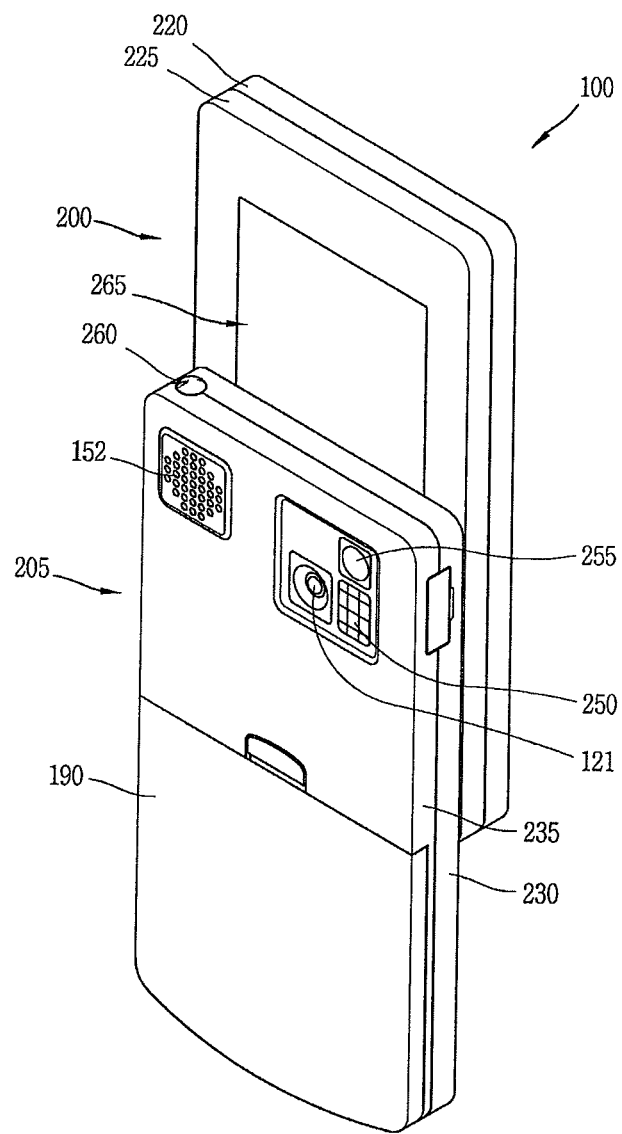
FIG. 3 is a rear perspective view of the mobile terminal shown in FIG. 2.

FIG. 3 is a rear side view of the mobile terminal 100 shown in FIG. 2. As shown in FIG. 3, the second body 205 includes the camera 121, and an associated flash 250 and mirror 255. The flash 250 operates in conjunction with the camera 121 of the second body 205, and the mirror 255 is useful for assisting a user to position the camera 121 in a self-portrait mode. In addition, the camera 121 of the second body 205 faces a direction which is opposite to a direction faced by the camera 121 of the first body 200 shown in FIG. 2.

In addition, each of the cameras 121 of the first and second bodies 200 and 205 may have the same or different capabilities. For example, in one embodiment, the camera 121 of the first body 200 operates with a relatively lower resolution than the camera 121 of the second body 205. Such an arrangement works well during a video conference call, for example, in which reverse link bandwidth capabilities may be limited. Further, the relatively higher resolution of the camera 121 of the second body 205 (FIG. 3) is useful for obtaining higher quality pictures for later use.

The second body 205 also includes the audio output module 152 configured as a speaker, and which is located on an upper side of the second body 205. The audio output modules of the first and second bodies 200 and 205 may also cooperate together to provide stereo output. Moreover, either or both of these audio output modules may be configured to operate as a speakerphone.

The terminal 100 also includes a broadcast signal receiving antenna 260 located at an upper end of the second body 205. The antenna 260 functions in cooperation with the broadcast receiving module 111 (FIG. 1). If desired, the antenna 260 may be fixed or configured to retract into the second body 205. Further, the rear side of the first body 200 includes a slide module 265, which slideably couples with a corresponding slide module located on the front side of the second body 205.

In addition, the illustrated arrangement of the various components of the first and second bodies 200 and 205 may be modified as required or desired. In general, some or all of the components of one body may alternatively be implemented on the other body. Further, the location and relative positioning of such components may be positioned at locations which differ from those shown by the representative figures.

In addition, the mobile terminal 100 of FIGS. 1-3 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include, for example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of a non-limiting example only, further description will relate to a CDMA communication system, but such teachings apply equally to other system types.

Figure 4:
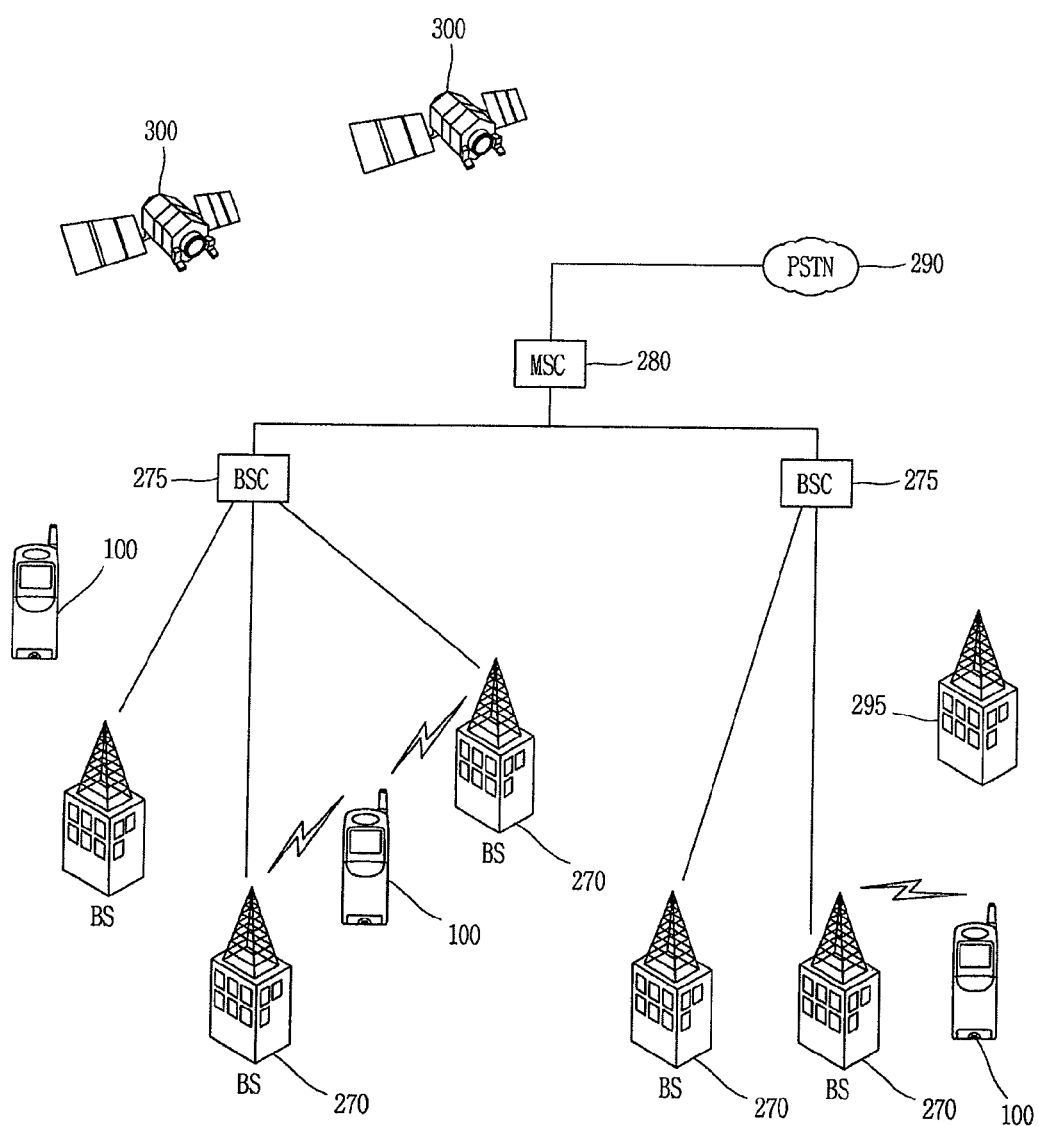
FIG. 4 is a block diagram of a CDMA wireless communication system operable with the mobile terminal of FIGS. 1-3 according to an embodiment of the present invention.

Next, FIG. 4 illustrates a CDMA wireless communication system having a plurality of mobile terminals 100, a plurality of base stations 270, a plurality of base station controllers (BSCs) 275, and a mobile switching center (MSC) 280.

The MSC 280 is configured to interface with a public switch telephone network (PSTN) 290, and the MSC 280 is also configured to interface with the BSCs 275. Further, the BSCs 275 are coupled to the base stations 270 via backhaul lines. In addition, the backhaul lines may be configured in accordance with any of several interfaces including, for example, E1/T1, ATM, IP, PPP, Frame Relay, HDSL, ADSL, or xDSL. Further, the system may include more than two BSCs 275.

Also, each base station 270 may include one or more sectors, each sector having an omnidirectional antenna or an antenna pointed in a particular direction radially away from the base station 270. Alternatively, each sector may include two antennas for diversity reception. In addition, each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some instances, the term "base station" may be used to refer collectively to a BSC 275, and one or more base stations 270.

The base stations 270 may also be denoted as "cell sites." Alternatively, individual sectors of a given base station 270 may be referred to as cell sites. Further, a terrestrial digital multimedia broadcasting (DMB) transmitter 295 is shown broadcasting to mobile terminals 100 operating within the system.

In addition, the broadcast receiving module 111 (FIG. 1) of the mobile terminal 100 is typically configured to receive broadcast signals transmitted by the DMB transmitter 295. Similar arrangements may be implemented for other types of broadcast and multicast signaling as discussed above.

FIG. 4 further illustrates several global positioning system (GPS) satellites 300. Such satellites facilitate locating the position of some or all of the mobile terminals 100. In FIG. 4, two satellites are shown, but positioning information may be obtained with greater or fewer satellites.

In addition, the position-location module 115 (FIG. 1) of the mobile terminal 100 is typically configured to cooperate with the satellites 300 to obtain desired position information. However, other types of position detection technology, such as location technology that may be used in addition to or instead of GPS location technology, may alternatively be implemented. Some or all of the GPS satellites 300 may alternatively or additionally be configured to provide satellite DMB transmissions.

Further, during typical operation of the wireless communication system, the base stations 270 receive sets of reverse-link signals from various mobile terminals 100. The mobile terminals 100 engage in calls, messaging, and other communications.

In addition, each reverse-link signal received by a given base station 270 is processed within that base station 270, and the resulting data is forwarded to an associated BSC 275. The BSC 275 provides call resource allocation and mobility management functionality including soft handoffs between the base stations 270.

Further, the BSCs 275 also route the received data to the MSC 280, which provides additional routing services for interfacing with the PSTN 290. Similarly, the PSTN interfaces with the MSC 280, and the MSC 280 interfaces with the BSCs 275. The BSCs 275 also control the base stations 270 to transmit sets of forward-link signals to the mobile terminals 100.

In the following description, a control method applicable to the above-configured mobile terminal 100 is explained with respect to various embodiments. However, the following embodiments can be implemented independently or through combinations thereof. In addition, in the following description, it is assumed that the display 151 includes a touch screen.

Further, wireless devices according to embodiments of the present invention may include short-range wireless communication devices that can be directly connected to a mobile terminal one by one without a repeater, and wireless communication devices that can be connected to a mobile terminal through a repeater.

Figure 5:
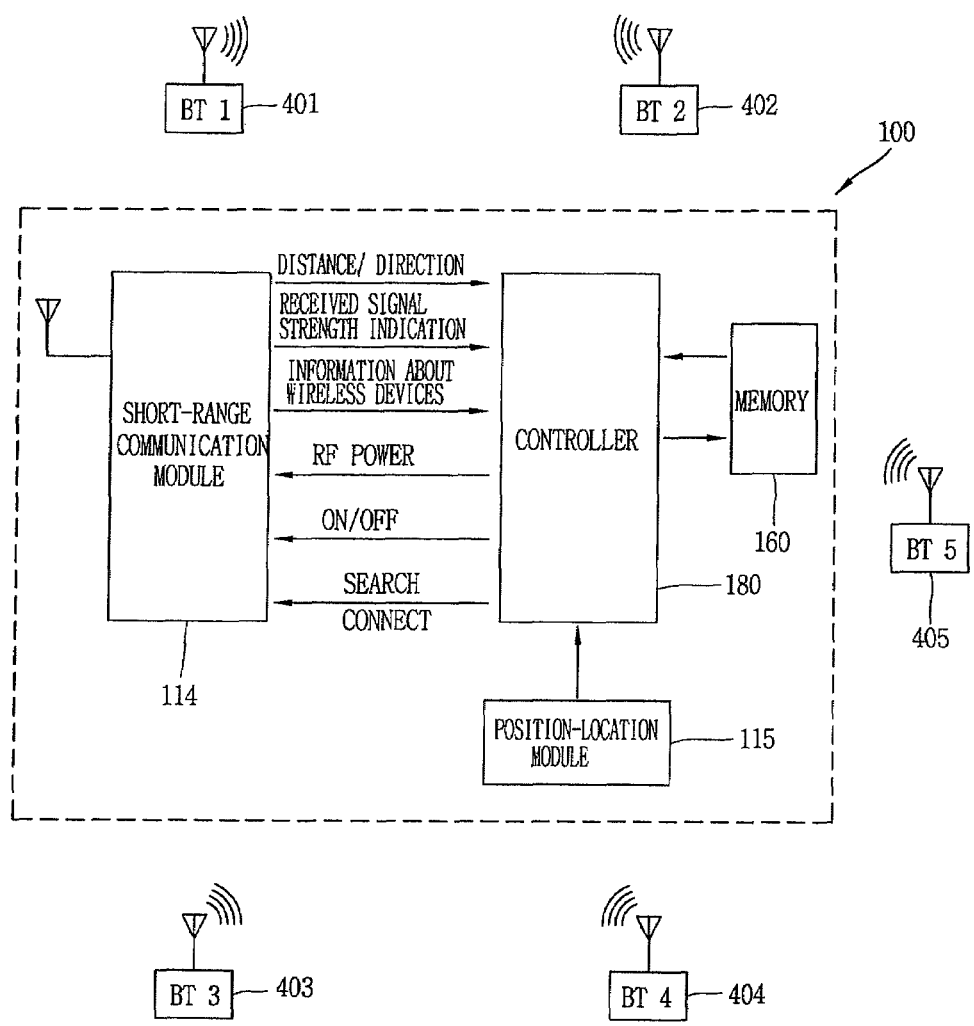
FIG. 5 is a block diagram of a mobile terminal and corresponding flow diagram illustrating a method for searching wireless devices according to an embodiment of the present invention.

Next, FIG. 5 is a block diagram of a mobile terminal and corresponding flow diagram for searching wireless devices according to an embodiment of the present invention. As shown in FIG. 5, external wireless devices (BT) 401-405 are able to communicate with the mobile terminal 100 (FIG. 1 illustrates the mobile terminal 100 in more detail). With reference to FIG. 5, when a user manipulates a specific menu so as to wirelessly connect a mobile terminal to peripheral wireless devices, a controller 180 of the mobile terminal enters into a connection mode.

Further, in the connection mode, peripheral wireless devices are searched to be registered to a pairing list. Also, peripheral wireless devices registered to the pairing list may be selected to be wirelessly connected to the mobile terminal. The process of searching corresponds to searching for peripheral wireless devices within a coverage, that is, a distance up to which an RF signal can reach.

For BLUETOOTH devices, the search range is divided into classes 1, 2 and 3 according to a power level or a coverage of an RF signal. Generally, the class 2 corresponding to a coverage of 10~17 m is used. The class 1 having a coverage of more than 100 m is also used. In addition, in the pairing or searching process, the mobile terminal functions as the master and searches peripheral wireless devices that operate as slaves or responders.

Further, when the mobile terminal searches for peripheral wireless devices, the peripheral wireless devices enter into an inquiry scan mode per a standardized specific period so as to respond to a search request. Also, when the mobile terminal is to be connected to one of the searched wireless devices, the corresponding peripheral wireless device enters into a page scan mode per a standardized specific period so as to respond to a connect request.

In addition, the pairing list is a registration information list of wireless devices that can be connected to the mobile terminal. Further, the mobile terminal to be connected to wireless devices has to input a pin code or password for each of the wireless devices. The pin codes or passwords are generally registered to the pairing list in advance such that the mobile terminal can automatically connect to the wireless devices registered to the pairing list.

That is, when the user selects a specific wireless device from the pairing list, the controller 180 can automatically wirelessly connect the selected wireless device to the mobile terminal using information registered to the pairing list. In embodiments of the present invention, a power level of an RF signal in the search mode or scan mode can be controlled to be less than that in a normal mode. Accordingly, the battery consumption of the mobile terminal is reduced.

Referring to FIG. 5, the short-range communication module 114 is turned ON/OFF under control of the controller 180. The communication module 114 also outputs a power level of an RF signal using a control command output from the controller 180, and outputs the signal for searching or connecting the mobile terminal to peripheral wireless devices. In addition, the battery consumption amount for the mobile terminal changes according to a power level of an RF signal.

Further, the memory 160 stores experimental information about mapping between a power level (strength) and a coverage of an RF signal to be transmitted. The search range is also determined according to a coverage of an RF signal. Also, the controller 180 can extract a power level of an RF signal with respect to a coverage from the memory 160.

The memory 160 also stores a plurality of skins to be used when displaying a search list or a pairing list. That is, the wireless devices are displayed on a particular skin according to each type and/or based on distances or signal strengths. In addition, the position-location module 115 includes a GPS reception chip and a GPS reception antenna, and detects a current position of the mobile terminal using a signal received from one or more satellites. The information about the current position is also sent to the controller 180.

Further, the controller 180 controls an ON/OFF operation of the position-location module 115. Thus, when there is a search request from other wireless devices, the controller 180 responds by including position information transmitted from the position-location module 115 within information about the wireless devices. The controller 180 also turns ON the short-range communication module 114 so as to search peripheral wireless devices, and extracts a power level of an RF signal corresponding to a search range set by a user from the memory 160, thereby setting the short-range communication module 114.

Also, the short-range communication module 114 searches wireless devices within a certain search range according to a power level of an RF signal set by the controller 180. For instance, if the set power level is high enough to correspond to a search range of '1 m', all wireless devices within 1 m respond. Likewise, if the set power level is high enough to correspond to a search range of '2 m', all wireless devices within 2 m respond. Note that the power level for search ranges of "1 m" and "2 m", for example, is less than the power used for a general search mode (e.g., no limit).

The controller 180 also obtains information about a MAC (Media Access Control) address, a name, a CoD (Class of Device), an RSSI (Received Signal Strength Indication), a distance, a position, and a direction of a wireless device from a signal received through the short-range communication module 114. For example, the information about the position and direction can be obtained when the wireless device transmits position information.

In addition, the controller 180 can detect each distance of wireless devices from the mobile terminal or each signal strength based on signals received from the searched wireless devices. For example, and as shown in FIG. 5, the controller 180 receives RSSI information, distance/direction information, and other information about the wireless devices. Then, the controller 180 can display the wireless devices according to each type based on the detected distances or signal strengths. Further, a suitable skin can extracted from the memory 160 and displayed on a search list.

Figure 6A:
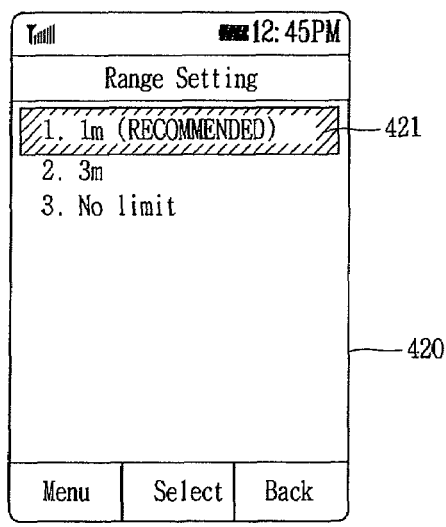
FIGS. 6A and 6B are overviews of environment setting display screens to search peripheral wireless devices of a mobile terminal according to an embodiment of the present invention.
Figure 6B:
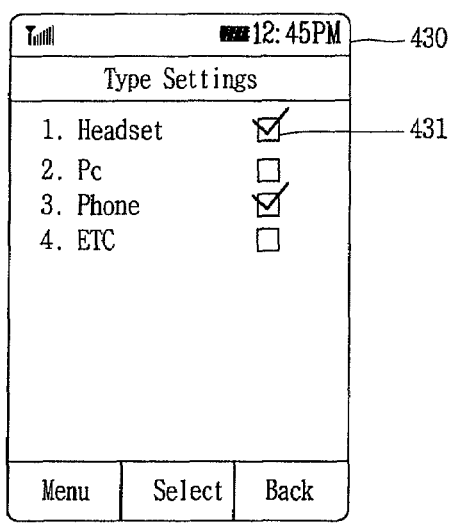

Next, FIGS. 6A and 6B are overviews of an environment setting display screens in a mobile terminal used to search peripheral wireless devices according to an embodiment of the present invention. As shown in the display screen 420 in FIG. 6A, the user can search for wireless devices within 1 m, 3 m and no limit. These distances are examples only and other distances can be used. Thus, the user can selectively determine the range to be used when pairing wireless devices to the mobile terminal. In the example in FIG. 6A, the user selects the option 421 "1 m (Recommended) 1 m range to search for wireless devices. The controller 180 then searches only wireless devices within the set search range according to the set power level of an RF signal, and displays the wireless devices. Thus, the mobile terminal uses less RF power and less battery consumption than when searching in a normal mode such as a no limit mode.

That is, a wireless device within one meter from the mobile terminal will use less battery consumption on both the mobile terminal and the wireless device than a wireless device at 3 m, for example. In more detail, when the search range is set as a 'maximum search range (No limit)', the controller 180 sets a power level (strength) of an RF signal as a power level corresponding to the maximum search range for the mobile terminal (e.g., class 1=100 m). Likewise, when a search range is set as a '1 m', the controller 180 sets a power level of an RF signal as a power level corresponding to the '1 m' for the mobile terminal, based on mapping information between a search range and a power level of an RF signal stored in the memory 160. Thus, the RF power level is less for 1 m than no limit, thereby saving power consumption of the battery.

In addition, FIG. 6B illustrates a display screen 430 that allows the user to selectively set the type of wireless devices to be searched for. That is, the user can select a plurality of wireless devices to be searched through check boxes 431. In the example shown in FIG. 6B, the user has selected a headset wireless device and a wireless phone. The controller 180 then searches for those type of devices within the range set in FIG. 6A and displays any found devices.

In addition, the operations shown in FIGS. 6A and 6B cab be reversed or performed independently of each other. In more detail, the user can first select a range in FIG. 6A and then select types of wireless devices in FIG. 6B. The controller 180 then searches for and displays devices that are within 1 m and that correspond to the type or types of wireless devices designated by the user.

Alternatively, the user can select only the range in FIG. 6A, and the controller 180 then searches and displays all wireless devices within the set range. Similarly, the user can only select a type or types of devices in FIG. 6B, and the controller 180 displays all selected types of wireless devices using the no limit power mode or a preset default power mode.

Figure 7:
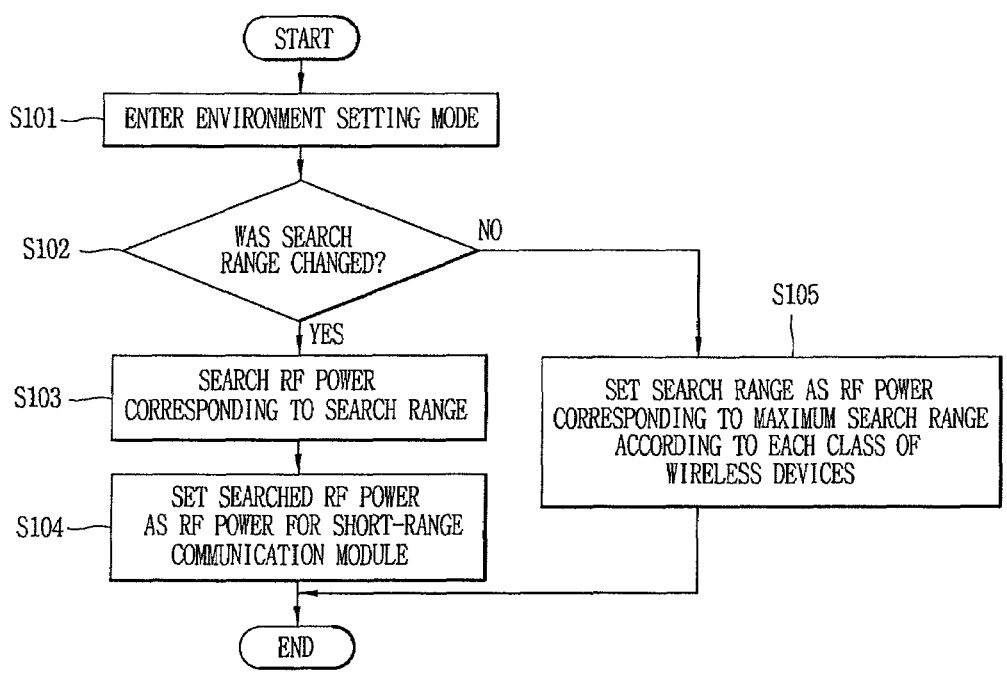
FIG. 7 is a flowchart illustrating an environment setting method for searching peripheral wireless devices of a mobile terminal according to an embodiment of the present invention.

Next, FIG. 7 is a flowchart showing environment setting processes for searching peripheral wireless devices of a mobile terminal according to an embodiment of the present invention. As shown in FIG. 7, the user first enters an environment setting mode by manipulating a specific key or menu option or by touching a soft key on the display, for example (S101). Other input methods are also possible (e.g., pressing a hot key, voice activation, etc.). Then, the user selects a search range and/or a type of wireless devices to be searched (as shown in FIGS. 6A and 6B).

The controller 180 then determines if the selected search range is different than a previously set search range or a default search range (S102). If the set range has changed (Yes in S102), the controller 180 searches for a power level of an RF signal that corresponds to the selected search range from the memory 160 (S103). Then, the controller 180 controls the short-range communication module 114 to use the power level of the RF signal that corresponds to the selected search range (S104).

In addition, when the controller 180 determines the search range has not changed in the environment setting processes (No in S102), the controller 180 sets a power level of an RF signal as a power level corresponding to a maximum search range according to each class of the mobile terminal (S105). Further, the controller 180 applies the changed power level of the RF signal only in a search mode and a scan mode. Also, in one embodiment, for services such as listening to music or file transmission, the controller 180 sets the power level of an RF signal as a maximum power level corresponding to a maximum search range defined in a specification.

Figure 8:
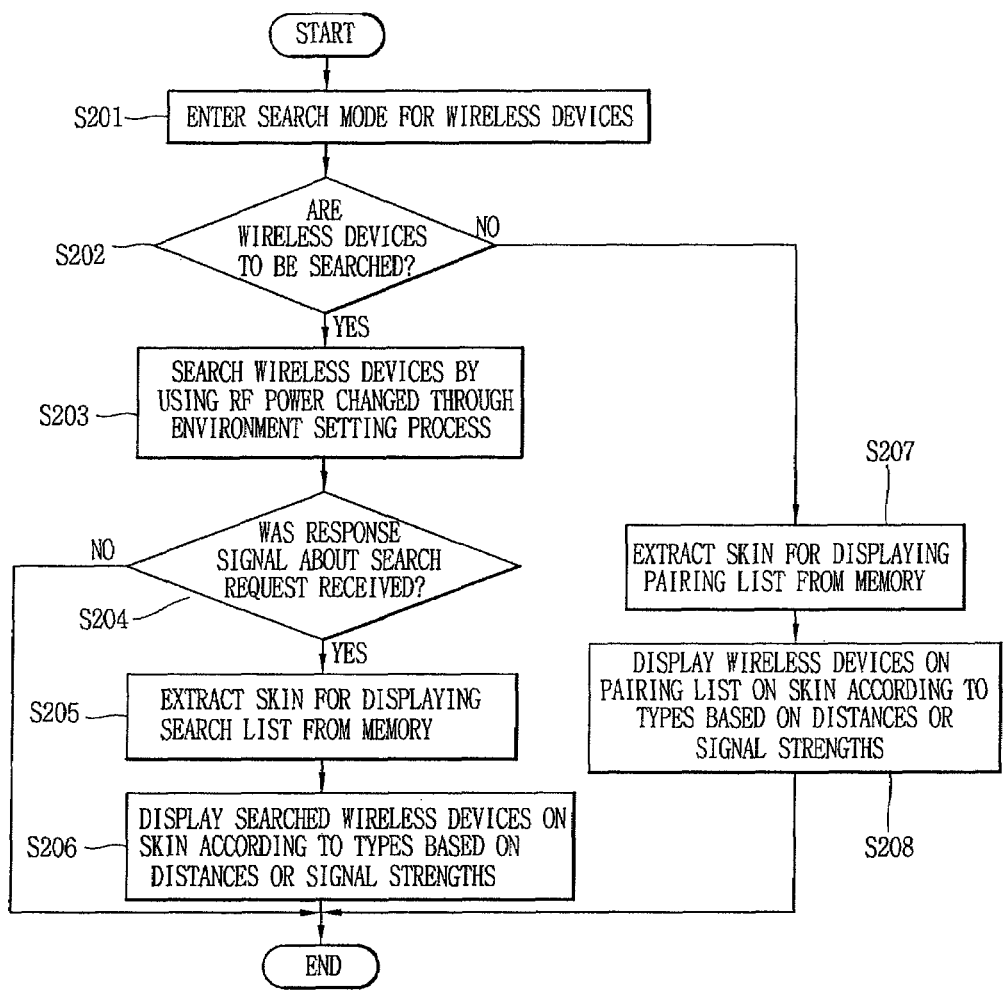
FIG. 8 is a flowchart illustrating a method for searching and displaying wireless devices of a mobile terminal according to an embodiment of the present invention.

In addition, after the controller 180 performs the search process, the controller 180 displays any found wireless devices that meet the set requirements (i.e., range and/or type). FIGS. 8-9D illustrate these features in more detail. In particular, FIG. 8 is a flowchart showing processes for searching and displaying found wireless devices in a mobile terminal according to an embodiment of the present invention.

As shown in FIG. 8, the mobile terminal enters a search mode on the terminal (S201), and requests the controller 180 search for peripheral wireless devices (Yes in S202). The controller 180 then controls the short-range communication module 114 to use the set RF power, and searches wireless devices based on the set power level (S203). That is, the controller 180 searches wireless devices within the set search range of the RF signal.

The controller 180 then determines if a response signal is received from any wireless device or devices (S204). When a response signal is received (Yes in S204), the controller 180 extracts a skin from the memory 160 for displaying a search list including the responded wireless devices (S205). Further, in one embodiment, the controller 180 displays the searched wireless devices according to each type based on each distance or each signal strength (S206).

Also, if the controller 180 determines no wireless devices are to be searched (No in S202), the controller 180 extracts a skin from the memory 160 for displaying a pairing list (S207), and then displays wireless devices on the pairing list according to each type based on each distance or each signal strength (S208). In addition, the skin is used to display wireless devices as two-dimensional or three-dimensional shapes. Extracted position information about each wireless device can also be displayed using the skin.

In addition, the distances of searched wireless devices can be experimentally calculated based on a received signal strength indication (RSSI). Also, position information of the wireless devices can be calculated based on a trigonometric method by communicating with three or more wireless devices within an effective range, or can be calculated by detecting position information included in a party's wireless device.

FIGS. 9A to 9D are overviews of display screens illustrating a method for searching and displaying a search list or a pairing list of a mobile terminal as two-dimensional or three-dimensional shapes according to an embodiment of the present invention.

Figure 9A:
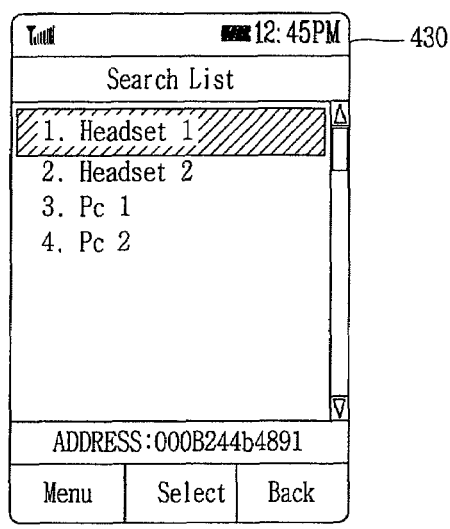
FIGS. 9A to 9D are overviews of display screens displaying a search list or a pairing list of a mobile terminal according to an embodiment of the present invention.

In FIG. 9A, the wireless devices are displayed in a searched order. Further, when the user selects one of the displayed wireless devices (the headset 1 in FIG. 9A), the controller 180 displays the MAC address of the selected wireless device at a lower portion of the screen 430. However, because the names of searched wireless devices are displayed, when more than a certain number of wireless devices (e.g., 6 or 7) are searched, it is difficult to display the wireless devices on one screen. Further, it is difficult for the user to select and pair a particular listed wireless device.

Figure 9B:
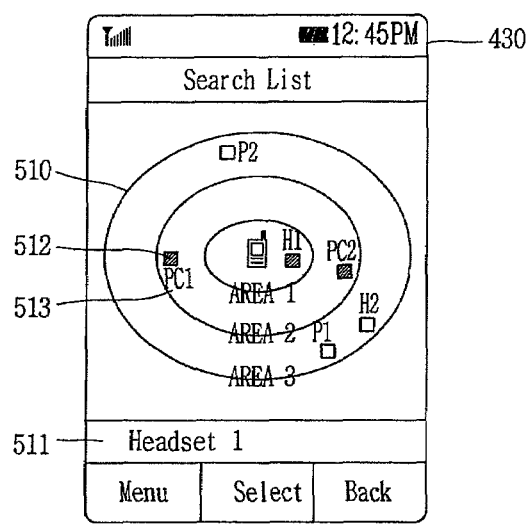
Figure 9C:
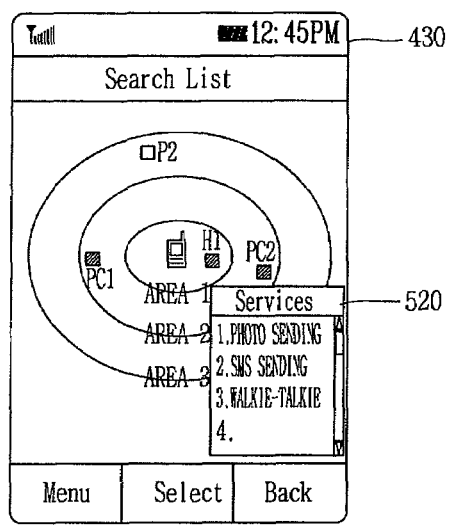
Figure 9D:
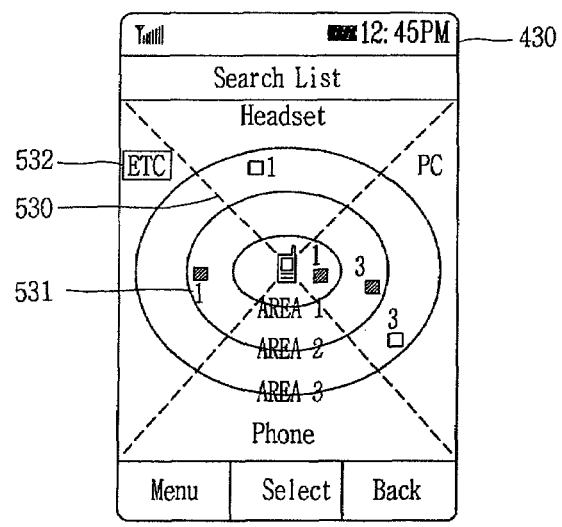

FIGS. 9B-9D solves these types of problems. In more detail, as shown in FIG. 9B, the controller 180 displays a skin including dividing lines 510 which show distances or power levels or signal lengths centering around a mobile terminal. In the example shown in FIG. 9B, the dividing lines 510 have an oval shape. However, other shapes may be used such as a circular shape, rectangular shape, etc. In addition, the controller 180 sterically displays the wireless devices using specific icons or images 512 according to their distances.

Further, the dividing lines 510 may be displayed with different gaps or in different colors according to distances or power level. Text which divide regions from each other (e.g., AREA 1~AREA N) may also be displayed on the dividing lines 510. The skin can have the circular shape, or any other shape such as a triangular shape obtained by cutting parts of a circle or a polygonal shape and including a rectangular shape.

The controller 180 can also display names 513 of the wireless devices, and display the specific images or icons 512 to have a shape e.g., headset, PC, or other type of wireless device indicating a type of the wireless device (e.g., headset, PC, or other type of wireless device) so the user can easily identify the type of the wireless device. Also, as shown in FIG. 9B, the names 513 indicate the types of wireless devices. For example, if a wireless device is a personal computer, the name 513 is displayed as 'PC', and if a wireless device is a headset, the name 513 is displayed as 'HS' in an abbreviated manner.

In addition, the controller 180 can display each wireless device at random within the particular areas or dividing lines 510 so as not to be concentrated in one region. Also, if there is position information about each wireless device, the controller 180 can display precise position of each wireless device. For example, the controller 180 can display the locations of the wireless devices with respect to the mobile terminal in the center of the display (see FIG. 9B, for example). Further, the displayed wireless devices can be selected using a specific button or touch input manner, and then the controller 190 displays more detailed information 511 about the selected wireless device (e.g., name) at a lower portion of the display screen 430.

In addition, as shown in FIG. 9C, when a wireless device is selected, the controller 180 displays hot service menus 520 indicating services that can be executed by the wireless device. For example, when one of the wireless devices shown in FIG. 9B or 9C is selected, the controller 180 displays executable services on a list in an overlay manner according to a type of the selected wireless device. A user can then select one of the services to execute it.

Further, in the embodiment shown in FIGS. 9B and 9C, the controller 180 displays each wireless device according to each distance or each signal length. The type of wireless device is also displayed. In an alternative embodiment and as shown in FIG. 9D, the controller 180 displays the types of the searched wireless devices using classifying lines 530. Also, the number of types of wireless devices that can be classified using the classifying lines 530 may include the number of types of wireless devices set in the environment setting mode. The types of searched wireless devices may also be classified according to the terminal itself regardless of an environment setting mode.

For example, when a search process is performed in an environment setting mode for only two types of wireless devices (e.g., Headset, Phone), two types of wireless devices are displayed. When there are three types of wireless devices as a result of search process, the three types of wireless devices are individually displayed. The controller 180 can also display a name 532 indicating the types of wireless devices at one side of the divided region.

FIG. 9D illustrates four types of devices (i.e., headset, PC, Phone and Etc.) The Etc. classification is for devices that do not have a particular listed type. In addition, the wireless devices displayed as icons or specific images may be displayed together with the names 531 so as to be easily identified by a user. Further, because the wireless devices are classified from each other in FIG. 9B, a more simple name 531 than the name 513 of FIG. 9B can be used.

In addition, the wireless devices displayed in FIGS. 9B-9D are within the range set by the user. For example, if the user selects the "3 m" range, the controller 180 displays all wireless devices that responded to the connect request. The controller 180 also displays the range of the wireless devices on the display screen. For example, in FIGS. 9B-9D, the area 1 can be for wireless devices within "1 m", the area 2 can be for wireless devices within "2 m", and the area 3 can be for wireless devices within "3 m." Thus, the user can easily see the names and locations of wireless devices, and select a particular device.

The controller 180 can also display each of the dividing or classification lines with a relatively larger or smaller size according to the number of searched wireless devices according to each type. The dividing lines 510 or the classifying lines 530 can also be displayed in other forms beside line shapes.

In addition, the skins shown in FIGS. 9A to 9D display a search list, but the same skin shape may be applied to a pairing list. Furthermore, the controller 180 can also display two-dimensional or three-dimensional skin shapes rather than the illustrated shapes shown in FIGS. 9B-9D.

In addition, the above various embodiments may be implemented in a computer-readable medium using, for example, computer software, hardware, or some combination thereof. For a hardware implementation, the embodiments described above may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, the memory 160), and executed by a controller or processor (for example, the controller 180).

In addition, the mobile terminal 100 may be implemented in a variety of different configurations. Examples of such configurations include a folder-type, slide-type, bar-type, rotational-type, swing-type and combinations thereof. The mobile terminal also includes terminals such as mobile phones, user equipment, smart phones, computers, digital broadcast terminals, portable multimedia players (PMP), navigators, etc.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile terminal, comprising:
a wireless communication unit;
a display unit;
an input unit;
a memory; and
a controller configured to:
display on the display unit a range setting screen for setting a distance range up to which an RF signal generated by the wireless communication unit can reach in response to an input for setting the distance range received via the input unit, the range setting screen comprising an input window for selecting the distance range in response to the input for setting the distance range;
unilaterally set a power level of the RF signal according to the distance range set in response to the input by accessing information mapping distance ranges to corresponding power levels of the RF signal, wherein the information mapping the distance rages to the corresponding power levels of the RF signal is stored in the memory;

transmit, via controlling the wireless communication unit, the RF signal of the power level to limit a search for at least one wireless device present within the distance range so that battery consumption of the mobile terminal is reduced compared to a search for the at least one wireless display on the display unit a range setting screen for setting a distance range up to which an device with no limit set on the power level of the RF signal;

display on the display unit the at least one wireless device when the at least one wireless device responds to the RF signal; and transmit, via controlling the wireless communication unit, an RF signal of a power level to limit a scan for a particular wireless device among the at least one wireless device displayed on the display unit within the distance range in response to an input for pairing the particular wireless device with the mobile terminal.

2. The mobile terminal of claim 1, wherein the distance range is set to be less than a maximum distance range of the RF signal.

3. The mobile terminal of claim 1, wherein the controller is further configured to control the display unit to display a list of services executable by one of the at least one wireless device responding to the RF signal in response to a selection of the one of the at least one wireless device via the input unit.

4. The mobile terminal of claim 1, wherein the controller is further configured to control the display unit to display a plurality of regions indicating signal strengths for the at least one wireless device responding to the RF signal, and to display information relating to each one of the at least one wireless device responding to the RF signal in a corresponding region.

5. The mobile terminal of claim 4, wherein the controller controls the display unit to display the plurality of regions using dividing lines and a plurality of colors so that the plurality of regions are distinguished from each other.

6. The mobile terminal of claim 1, wherein the controller is further configured to control the display unit to display a name or an image indicating a type of each one of the at least one wireless device responding to the RF signal.

7. The mobile terminal of claim 1, wherein the controller is further configured to control the display unit to display a plurality of regions and to display a same type of the at least one wireless device responding to the RF signal on each one of the plurality of regions.

8. A method of controlling a mobile terminal, the method comprising:

displaying a range setting screen for setting a distance range up to which an RF signal can reach in response to an input, the range setting screen comprising an input window for selecting the distance range in response to the input for setting the distance range;

unilaterally setting a power level of the RF signal according to the distance range set in response to the input by accessing information mapping distance ranges to corresponding power levels of the RF signal, wherein the information mapping the distance ranges to the corresponding power levels of the RF signal is stored in a memory of the mobile terminal;

transmitting the RF signal of the power level to limit a search for at least one wireless device present within the distance range so that battery consumption of the mobile terminal is reduced compared to a search for the at least one wireless device with no limit set on the power level of the RF signal;

displaying the at least one wireless device when the at least one wireless device responds to the RF signal; and transmitting an RF signal of a power level to limit a scan for a particular wireless device of the at least one wireless device displayed on the display unit within the distance range in response to an input for pairing the particular wireless device with the mobile terminal.

9. The method of claim 8, wherein the distance range is set to be less than a maximum range of the RF signal.

10. The method of claim 8, further comprising:

displaying a list of services provided by the one of the at least one responding wireless device responding to the RF signal in response to a selection of the one of the at least one wireless device via the input unit.

11. The method of claim 8, wherein the displaying the at least one wireless device comprises displaying a plurality of regions indicating signal strengths for the at least one wireless device responding to the RF signal, and displaying information relating to each one of the at least one wireless device responding to the RF signal in a corresponding region.

12. The method of claim 11, wherein the displaying the at least one wireless device comprises displaying the plurality of regions using dividing lines and a plurality of colors so that the plurality of regions are distinguished from each other.

13. The method of claim 8, wherein the displaying the at least one wireless device comprises displaying name or an image indicating a type of each one of the at least one wireless device responding to the RF signal.

14. The method of claim 8, wherein the displaying the at least one wireless device comprises displaying a plurality of regions and displaying a same type of the at least one wireless device responding to the RF signal on each one of the plurality of regions.

15. A method of controlling a mobile terminal, the method comprising:

displaying, on a display unit, a screen for setting a distance range up to which an RF signal can reach in response to a first input and for setting a type of wireless devices in response to a second input, the screen for setting the distance range comprising an input window for selecting the distance range in response to the first input;

unilaterally setting a power level of the RF signal according to the distance range set in response to the first input by accessing information mapping distance ranges to corresponding power levels of the RF signal, wherein the information mapping the distance ranges to the corresponding power levels of the RF signal is stored in a memory of the mobile terminal;

transmitting the RF signal of the power level to limit a search for at least one wireless device of the type of wireless devices set by the second input present within the distance range so that battery consumption of the mobile terminal is reduced compared to a search for the at least one wireless device with no limit set on the power level of the RF signal;

displaying, on the display unit, the at least one wireless device when the at least one wireless device responds to the RF signal; and transmitting an RF signal of a power level to limit a scan for a particular wireless device of the at least one wireless device displayed on the display unit within the distance range in response to a third input for pairing the particular wireless device with the mobile terminal.

* * * * *